United States Patent [19]

Imai et al.

[11] Patent Number: 5,593,577
[45] Date of Patent: Jan. 14, 1997

[54] FILTER HAVING INTERNALLY THREADED COVER NON-ROTATABLY MOUNTED TO CASING OF THE FILTER

[75] Inventors: Koji Imai; Toshiya Wakahoi; Hiromitsu Adachi, all of Wako; Keiichi Terada, Hamakita; Hiroaki Yamashita, Hamakita; Hiroshi Morikawa, Hamakita, all of Japan

[73] Assignees: Toyo Roki Seizo Kabushikikaisha, Shizuoka-ken; Honda Giken Kogyo Kabushiki Kaisha, Tokyo, both of Japan

[21] Appl. No.: 328,267

[22] Filed: Sep. 30, 1994

[30] Foreign Application Priority Data

Oct. 1, 1993 [JP] Japan .................. 5-269857
Oct. 1, 1993 [JP] Japan .................. 5-269858

[51] Int. Cl.⁶ .................. B01D 35/30
[52] U.S. Cl. .................. 210/232; 210/352; 210/440; 210/453
[58] Field of Search .................. 210/232, 440, 210/443, 444, 450, 454, 455, DIG. 17, 352, 435, 453

[56] References Cited

U.S. PATENT DOCUMENTS

| | | | |
|---|---|---|---|
| 3,724,665 | 4/1973 | Hall | 210/440 |
| 4,120,794 | 10/1978 | Taylor | 210/453 |
| 4,172,798 | 10/1977 | Kronsbein | 210/450 |
| 5,035,797 | 7/1991 | Janik | 210/232 |
| 5,186,829 | 2/1993 | Janik | 210/454 |

FOREIGN PATENT DOCUMENTS

| | | | |
|---|---|---|---|
| 318079 | 5/1989 | European Pat. Off. | 210/443 |
| 0442365 | 8/1991 | European Pat. Off. | |
| 2346035 | 10/1977 | France . | |
| 2381551 | 9/1978 | France . | |
| 1192087 | 5/1970 | United Kingdom . | |

*Primary Examiner*—Matthew O. Savage
*Attorney, Agent, or Firm*—Wenderoth, Lind & Ponack

[57] ABSTRACT

A filter includes a case, filtering material housed within the case, a cover which covers the open end of the case and is non-rotatable relative to the case, and an annular fastener clamping the cover to the case. The case includes a large-diameter portion at an open end of the case, the large-diameter portion including a convexity forming an engagement tab. The cover has a concavity into which the convexity is received to prevent the cover from rotating relative to the case. Moreover, the cover includes a screw thread on the outer periphery thereof. The annular fastener has a screw thread on the inner periphery thereof mated with the screw thread on the outer periphery of the cover. On the other hand, the annular fastener has a small-diameter portion engaged with the large-diameter portion of the case by which engagement and mating of the screw threads the annular fastener secures the cover to the case. By preventing relative rotation between the cover and the case, the filter can be easily installed by being screwed onto a threaded member of an automotive engine or the like.

19 Claims, 8 Drawing Sheets

FILTER HAVING INTERNALLY THREADED COVER NON-ROTATABLY MOUNTED TO CASING OF THE FILTER

BACKGROUND OF THE INVENTION

1. Field of the Invention

This invention relates to a filter and, more particularly, to a filter having replaceable filtering material.

2. Description of the Prior Art

Japanese Unexamined Practical Idea Publication No. 3-46812 discloses a prior art filter.

Figure 13:
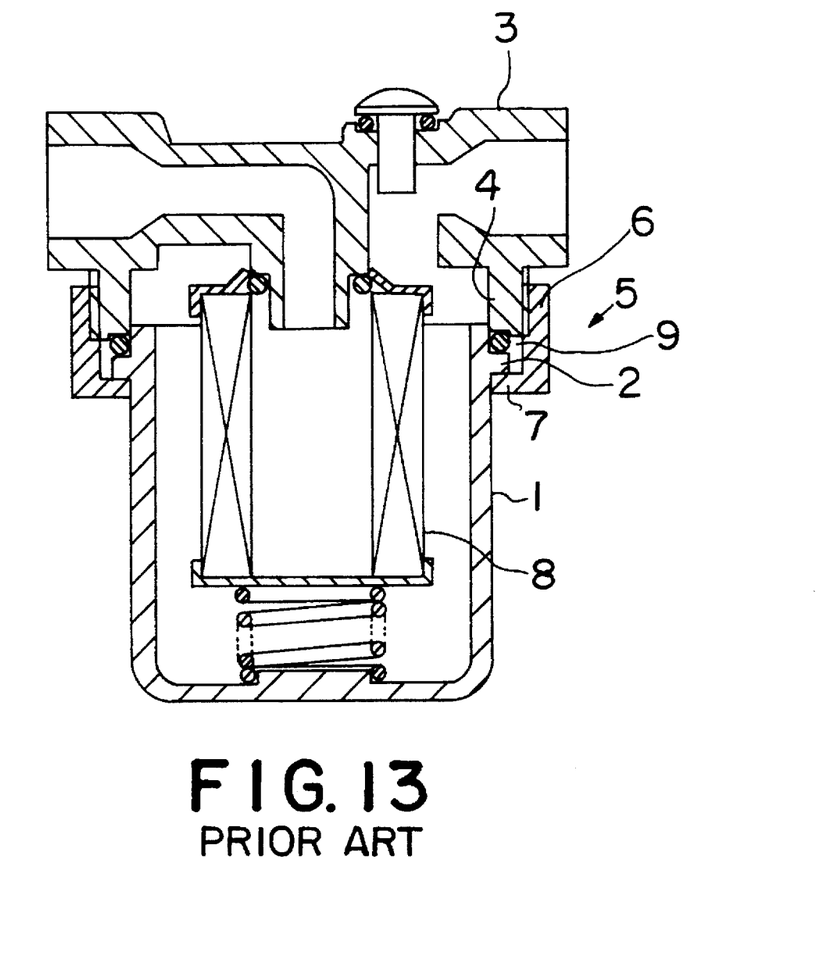
FIG. 13 is a sectional view of a prior art oil filter.

As shown in FIG. 13, this filter includes a case 1 having a cup-shaped body and a flange 2 which extends radially from the outer periphery of the body proximate the open end of the body. A cover 3 covers the open end of the case 1. The cover 3 includes a tubular portion 4, the inner diameter of which is sized to receive the open end of the case 1. The tubular portion 4 constitutes a male portion on which a screw thread is formed.

An annular fastener 5 has an L-shaped cross section constituted by a cylindrical portion 6 and a retainer 7. A screw thread screwable to the male thread of the tubular portion 4 is formed at the inner peripheral surface of cylindrical portion 6, whereby the cylindrical portion 6 constitutes a female portion of the fastener. The retainer 7 extends from the end of the cylindrical portion 6 toward the center of the fastener 5. The inner diameter of the cylindrical portion 6 is larger than the outer diameter of the case taken at the flange 2, and the inner diameter of the retainer 7 is smaller than the outer diameter taken at the flange 2 but larger than the outer diameter of the cup-shaped body of the case. A filtering material 8 is housed within the case 1.

When the case 1 and cover member 3 are to be secured, an O-ring 9 is disposed on the flange 2 of the case 1, and the open end of the case 1 is inserted into the tubular portion 4 of the cover 3. Next, the fastener 5 is fitted over the case 1 whereupon the case passes through the cylindrical portion 6 and retainer 7. The screw thread formed on the inner periphery of the cylindrical portion 6 and the screw thread formed on the outer periphery of the tubular portion 4 are screwed together by rotating the fastener 5 in one direction. When so tightened, the retainer 7 contacts the flange 2, becomes integrated with the cover 3, and pulls the case 1 into the cover 3.

When the case 1 is to be removed, the fastener 5 is rotated in the opposite direction.

In the above-described prior art filter apparatus, if the case 1 is supported and the fastener 5 is rotated, the cover 3 tends to rotate together with the fastener 5, whereby it is not possible to secure the cover 3 tightly to the case 1. In particular, when the cover 3 has a generally overall planar configuration and a threaded hole formed at the center thereof, and an attempt is made to screw a threaded portion protruding from an engine into the threaded hole, as in an automotive oil filter, the cover 3 will slip. Therefore, it is difficult to secure the cover 3 to the engine.

SUMMARY OF THE INVENTION

For this reason, it is an object of this invention to provide a filter which prevents relative rotation of the case and cover while nonetheless allowing the case and cover to be freely detached from and attached to one another.

To achieve this object, the filter apparatus of the present invention comprises a cup-shaped case including a shell portion constituting the peripheral side wall of the case, a bottom at one end of the shell portion, and a large-diameter portion at the other end of the shell portion and the diameter of which is larger than that of the shell portion, the large diameter portion including a convexity; filtering material housed within the case; and a cover covering the open end of the case and having a communication hole which places the interior and exterior of the case in communication, a screw thread on the outer periphery thereof, and a concavity into which the convexity of the case extends; and an annular fastener having a screw thread at the inner periphery thereof threaded to the screw thread of the cover, and a small-diameter portion the diameter of which is smaller than that of the large-diameter portion of the case.

In this filter, the cover and case cannot be rotated relative to one another because the convexity of the case member extends into the concavity of the cover. Further, the screw thread at the inner periphery of the fastener is mated with the screw thread at the outer periphery of the cover to clamp and secure the cover member to the open end of the case.

Thus, although the cover and case cannot rotate relative to one another, the cover remains detachable from the case so that the filtering material can be readily replaced.

The concavity includes an opening which may be in the form of a through-hole which passes through the cover.

Accordingly, the insertion of the convexity in the through-hole can be confirmed from the exposed side of the cover opposite the case.

Alternatively, the opening in the concavity may be in the form of a notch formed in the periphery of the cover at which the screw thread is also formed. The convexity of the case is received in this notch.

Because the notch is formed in the outer periphery of the cover, the external configuration of the cover can be made as small as possible.

DETAILED DESCRIPTION OF THE PREFERRED EMBODIMENTS

Figure 1:
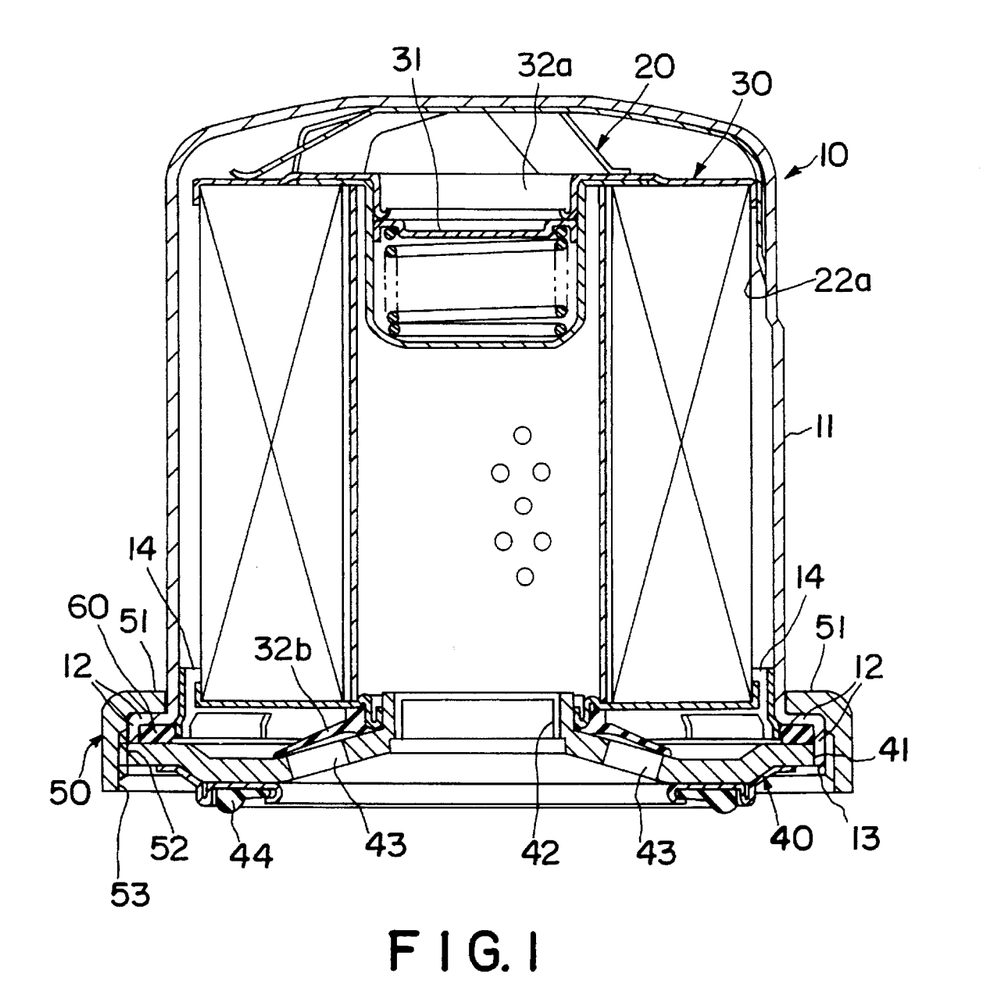
FIG. 1 is a sectional view of a first embodiment of a filter for automotive use according to the present invention.

Referring to FIG. 1, a resilient support in the form of a leaf spring 20, and a cartridge-type of filter element 30 are housed within a cup-shaped case 10 having a bottom. The open end of the case 10 is covered with a cover in the form of set plate 40 fixed to the casing 10 with a ring-shaped fastener 50.

Figure 2:
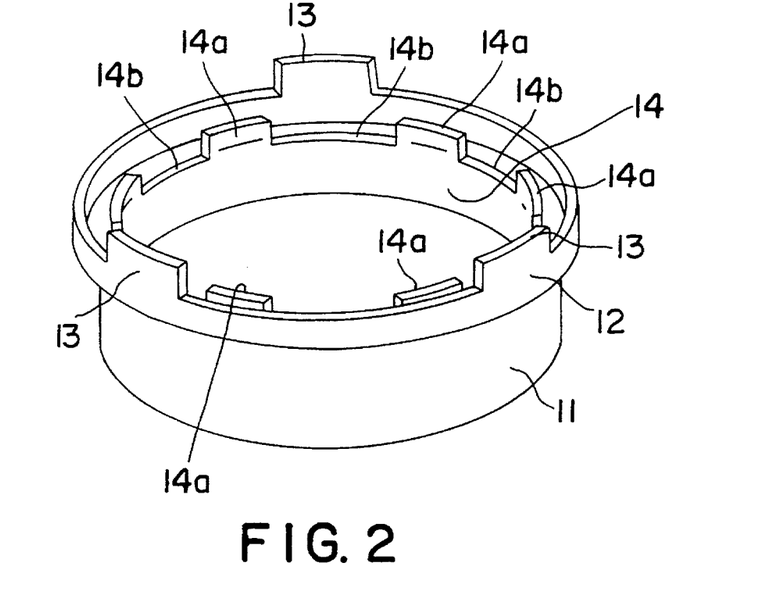
FIG. 2 is a perspective view of an open end of a casing of the filter.
Figure 3:
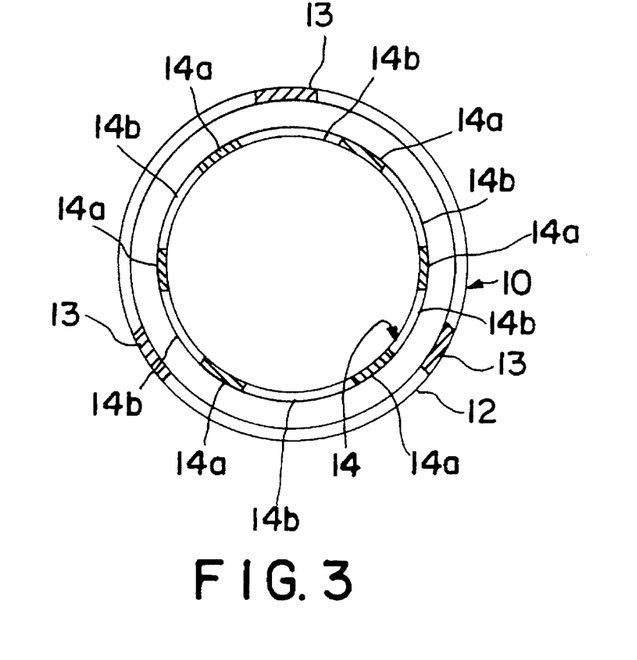
FIG. 3 is a cross-sectional view of the open end of the casing.

The open end of the case 10 is constituted by a large-diameter portion 12, the diameter of which is slightly larger than that of a shell portion 11 of the same case, whereby the cross section of the peripheral wall of the case is somewhat crank-shaped. Engagement tabs (convexities) 13 are formed at three locations at uniformly spaced intervals on the end of the large-diameter portion 12, as shown in FIGS. 2 and 3. An annular partition member 14 is welded to the inner periphery of the casing 10 proximate the junction of the large-diameter portion 12 and the shell portion 11. This partition member 14 protrudes from the junction toward the open end of the casing, and convexities 14a and notches 14b are formed at six locations at uniformly spaced intervals on the protruding end of the partition member 14. The terminal edges of the convexities 14a are coplanar with the edge of the large-diameter portion 12.

Figure 4:
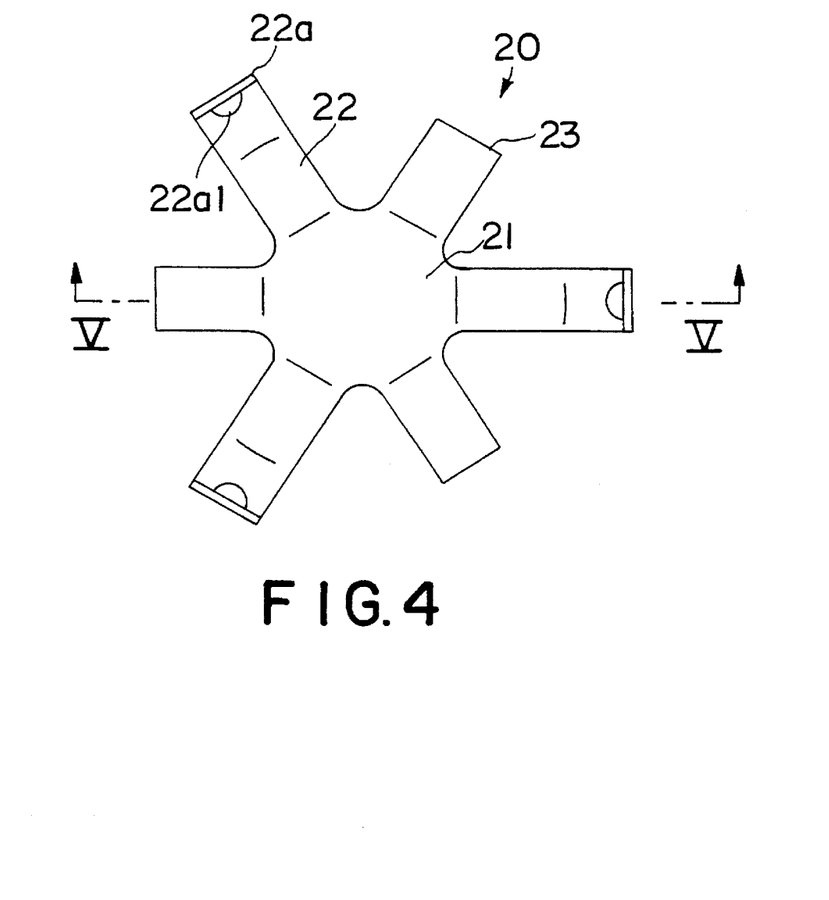
FIG. 4 is a plan view of a spring of the filter.
Figure 5:
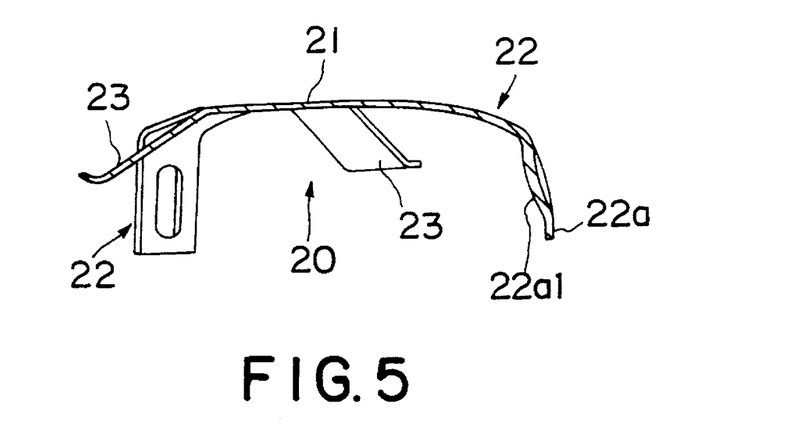
FIG. 5 is a sectional view of the spring taken along line V—V of FIG. 4.

The spring 20 is formed by cutting a plate of resilient material to a specified configuration. As shown in FIGS. 4 and 5, the spring 20 has six arms extending radially at uniform intervals from a base 21. These arms include three longer wall-contacting arms 22 and three shorter element-supporting arms 23 alternately disposed around the base 21. Each longer wall-contacting arm 22, constituting an engagement portion of the spring (resilient support) has an end 22a bent about 110 degrees from the portion of the arm extending from base 21, the angle being selected so that the ends 22a push against the inner periphery of the case 10 when the spring 20 is inserted into the case 10. Additionally, a respective positioning tab 22a1 protrudes as a ridge at the inner peripheral surface of each end 22a of the arms 22. The space enclosed by the respective positioning tabs 22a when the spring 20 is inserted into the case 10 is slightly smaller than the outer dimensions of the filter element 30. Moreover, the fit between the spring 20 and filter element 30 will be likely to become loose if the material of the spring 20 is excessively stiff. Therefore, a material of sufficient resiliency is used.

Each element-supporting arm 23 extends to a location short of the inner periphery of the case 10, and is bent from the base 21 as are the wall-contacting arms 22.

The filter element 30 comprises an overall tubular ribbed configuration of filter paper, members covering the two annular end faces of the filter paper so as to form a tube with the filter paper, and a relief valve 31 closing one open end of the tube. However, the relief valve 31 is disposed deep within the central opening of the tube so that a recess 32a is left at the closed end of the tube. Additionally, a ring-shaped seal member 32b is disposed at the open side of the tube as extending from the perimeter of the central opening toward the outer periphery of the tube.

Figure 6:
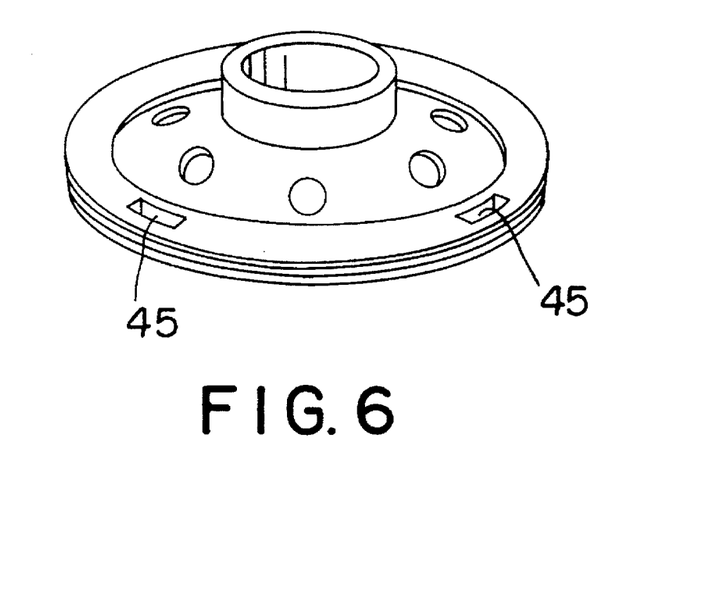
FIG. 6 is a perspective view of another form of a set plate of the filter according to the present invention.

The disk-shaped set plate 40 has a diameter slightly larger than the large-diameter portion 12, and openings in the form of notches 41 are formed on the peripheral wall thereof which receive the engagement tabs 13 of the casing 10. Alternatively, as shown in FIG. 6, the set plate 40 may include openings in the form of engagement holes (through-holes) 45 which receive the engagement tabs 13, whereby the inserted state of the engagement tabs 13 in the holes 45 can be visually confirmed. When notched, however, the set plate 40 can have a comparatively small diameter and is more compact overall. The center portion of the set plate 40 protrudes into the casing 10. The center of the set plate 40 also forms a discharge port 42 insertable into the open end of the filter element 30 and having a screw thread (female) on the inner peripheral wall thereof. A plurality of intake ports 43 are formed along the perimeter of the discharge port 42. Furthermore, a seal member 44 is provided on the outer surface of the set plate 40.

A ring-shaped fastener 50 has an L-shaped cross section constituted by a cylindrical portion and a small-diameter portion 51 bent from the cylindrical portion toward the axial center of the filter. The large-diameter portion 12 of the case 10 is received in the cylindrical portion of fastener 50. However, the shell portion 11 but not the large-diameter portion 12 of the case can be passed through the small-diameter portion 51. Additionally, a screw thread 52 (female) is formed on the inner peripheral surface of the cylindrical portion of the fastener 50, and the portion of the fastener 50 from the end thereof to the screw thread 52 constitutes a guide portion 53. This guide portion is unthreaded, i.e. has a smooth inner surface.

Next, the method for assembling the filter will be described.

First, the partition member 14 is welded to the inner periphery of the case 10 in a position at which the notches 14b formed in the end of the partition member 14 overlie the engagement tabs 13 of the casing 10 in the radial direction. According to this embodiment, the number of notches 14b is greater than the number of engagement tabs 13, thereby facilitating such a relative positioning. The O-ring is fitted in the resulting annular groove formed between the large-diameter portion 12 and the convexities 14a of the partition member 14 the O-ring can be pressed into the groove from the outside at those locations lacking the engagement tabs 13 but at those locations occupied by the engagement tabs 13 the O-ring can be pressed into the groove from the inside of the apparatus via the notches 14b.

Figure 7:
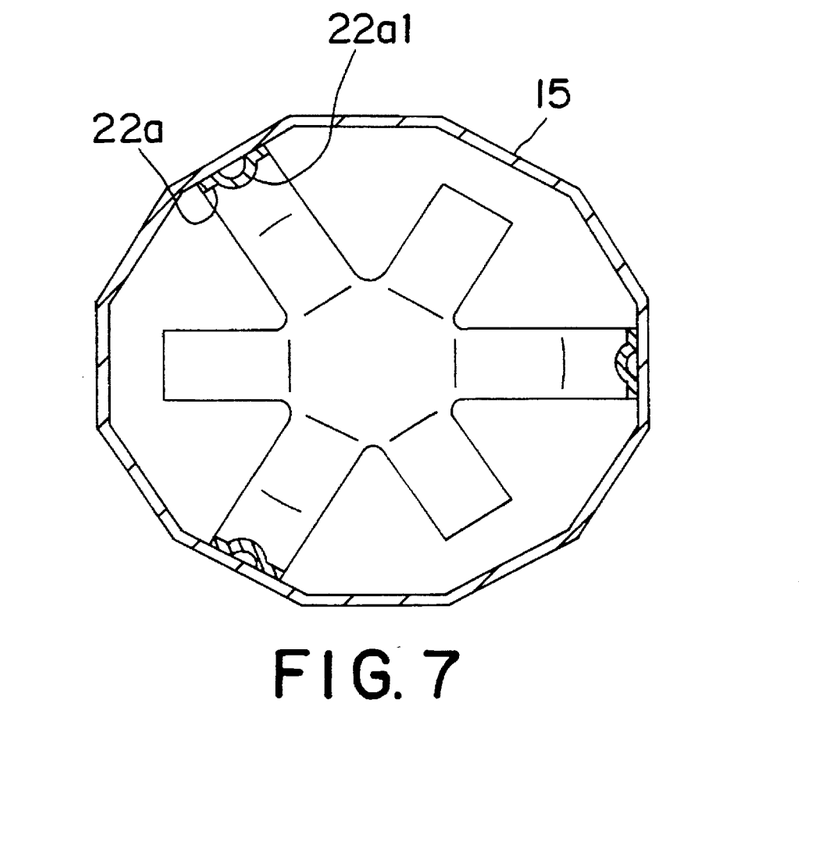
FIG. 7 is a cross-sectional view of the filter showing an engaged state of the spring and casing thereof.

Once the O-ring 60 has been inserted, the spring 20 is fitted to the case 10. Because the ends 22a of the wall-contacting arms 22 are bent at an angle of about 110 degrees, the wall-contacting arms 22 are flexed inwardly as the spring 20 is pressed into the case 10. Because the well-contacting arms 22 flex uniformly, the spring 20 is maintained substantially at the center of the case 10. Additionally, as shown in FIG. 7, the case 10 has a polygonal cross section at the portion 15 thereof receiving the spring 20. The ends 22a engage flat surfaces of the portion 15, thereby preventing the spring 20 from rotating relative to the case 10 and causing wear.

Subsequently, the filter element 30 is inserted into the case 10 with the relief valve 31 first. Because the space enclosed by the positioning tabs 22a formed on the ends 22a of the wall-contacting arms 22 is slightly smaller than the external configuration of the end of the filter element 30, the tabs 22a1 are abutted by the filter element 30. By applying an additional amount of force on the filter element 30, the positioning tabs 22a and ends 22a are flexed outwardly so that the filter element 30 can be fully inserted into the interior of the case 10. At this time, the filter element 30 is positioned substantially in the center of the filter by the three uniformly disposed positioning tabs 22a1. That is to say, the filter element 30 can be correctly positioned simply inserting the same into the case 10 provided with the spring 20.

Meanwhile, once the filter element 30 has been housed within the case 10, one end face on the filter element 30 contacts the tips of the element-supporting arms 23. Because the element-supporting arms 23 are resilient, the filter element 30 is elastically supported.

Next, the case 10 is covered with the set plate 40. At this time, the notches 41 formed on the outer periphery of the set plate 40 and the engagement tabs 13 of the casing 10 are aligned and the engagement tabs 13 are inserted into the notches 41. At this time, the center of the set plate 40 is received in the central opening of the filter element. When the set plate 40 is installed, the element-supporting arms 23 of the spring 20 are flexed as the filter element 30 is pressed into the case 10. The seal member 32b of the filter element 30 contacts the perimeter of the discharge port 42 and forms a seal. As a result, the space enclosed by the case 10 and the set plate 40 is separated into an inner side of the filter element 30 communicating with the exterior via the discharge port 42 and an outer side of the filter element 30 communicating with the exterior via the intake ports 43. That is to say, the filter paper of the filter element 30 is interposed between the discharge port 42 and the intake ports 43 within the casing 10. Moreover, when pressure rises to a predetermined level or higher, the valve 31 opens and the discharge port 42 and the intake ports 43 are placed in communication via recess 32.

Additionally, when the open end of the case 10 is covered with the set plate 40, the O-ring 60 is contacted and deformed by the set plate 40 so that an air-tight seal is formed.

Next, the case 10 is inserted bottom first through the fastener 50 from the end thereof opposite the small-diameter portion 51. The end of the fastener 50 opposite the small-diameter portion 51 clears the large-diameter portion 12 of the case 10 and becomes located adjacent the periphery of the set plate 40. That is, the set plate 40 is located in the guide portion 53 of the fastener 50. The guide portion 53 is spaced axially from the female thread 52, and thus the set plate 40 is free to rotate. When the fastener 50 is rotated in this state, the screw thread on the periphery of the set plate 40 and the screw thread 52 on the inner peripheral surface of the fastener 50 are mated. Because the set plate 40 and fastener 50 are axially aligned by the guide portion 53, the threading of the set plate 40 to the fastener 50 is comparatively easy. Moreover, the guide portion 53 locates the center of gravity of the fastener closer to the location at which the filter is connected to an engine. The filter is less subject to vibrations than if no guide portion were provided.

Figure 8:
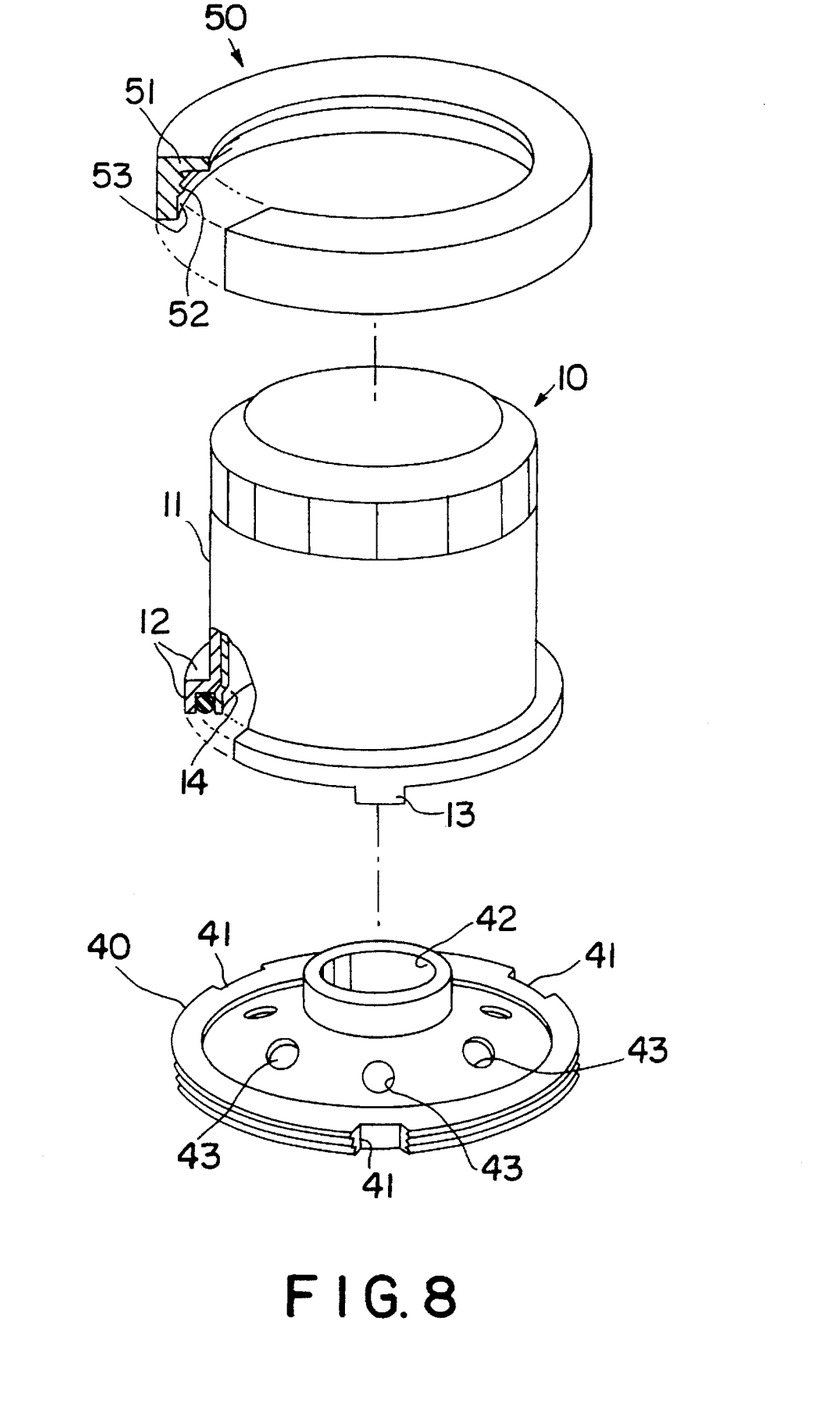
FIG. 8 is an exploded view of the filter.

When the two threads are screwed together, the set plate 40 is located within the small-diameter portion 51 of the fastener 50. The large-diameter portion 12 of the case 10 is squeezed between the set plate 40 and the small-diameter portion 51 of the fastener 50. However, because the large-diameter portion 12 cannot pass through the small-diameter portion 51, the set plate 40 is pressed against the large-diameter portion 12 by the fastener 50. The assembled state of the case 10, set plate 40, fastener 50 is depicted in the exploded perspective view of FIG. 8.

Briefly, the set plate 40 becomes nonrotatable with respect to the case 10 because of the notches 41 and engagement tabs 13. Furthermore, relative axial movement of the parts is prevented by the fastener 50. When the filter apparatus is installed in an engine of an automobile, a screw protruding from an installation surface is screwed to the thread formed on the inner peripheral wall of the discharge port 42 of the set plate 40. At this time, when the casing 10 is rotated, the set plate 40 also rotates so the apparatus can be assuredly attached to or detached from the male screw. Additionally, after detachment, when the fastener 50 is rotated the set plate 40 will be detached from the case 10. The case 10 and the like can be reused once the filter element 30 is replaced.

Figure 9:
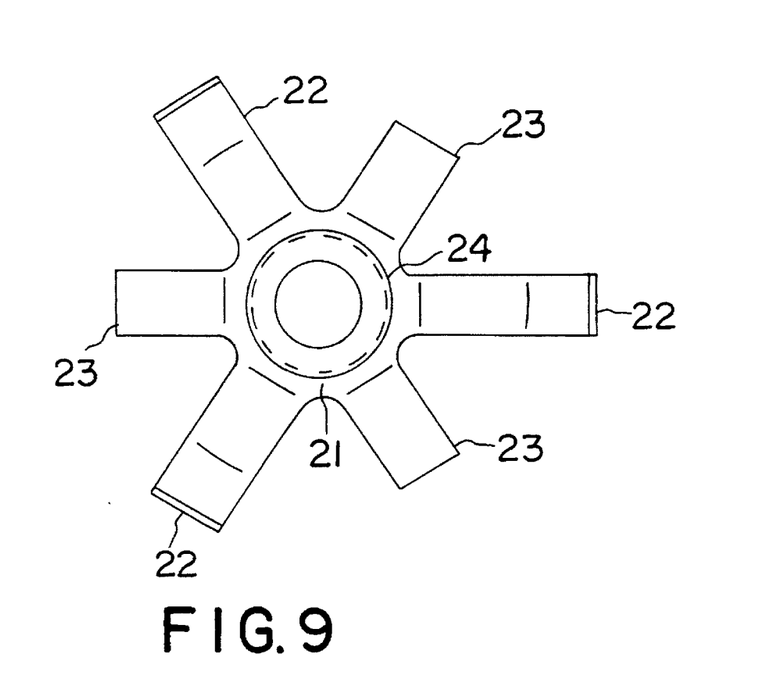
FIG. 9 is a plan view of another form of a spring of the filter according to the present invention.

FIG. 9 depicts another form of the spring of the filter according to the present invention.

In this spring, the positioning tabs 22a formed at the ends 22a of the wall-contacting arms 22 are not provided. Instead, a convexity 24 which is insertable into the recess 32a in the filter element 30 protrudes from the center of the base 21.

Figure 10:
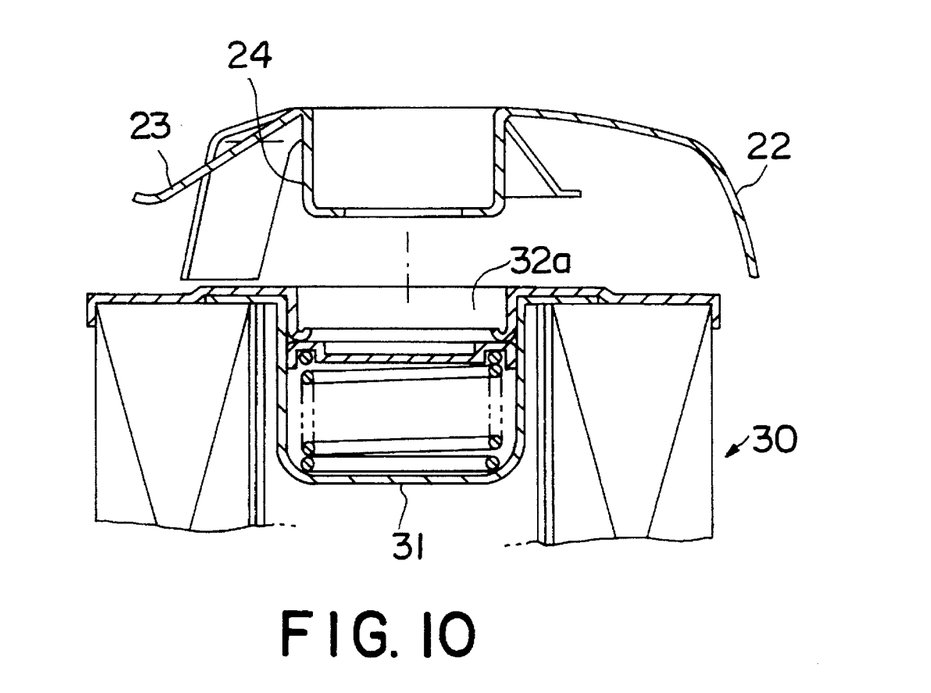
FIG. 10 is an exploded view of a spring and filter element of the filter.

Similarly to the embodiment described above, the spring 20 is pressed into the case 10 thereby causing the wall-contacting arms 22 to flex, and the filter element 30 is inserted relief valve 31 first into the case 10 as shown in FIG. 10. When the filter element 30 is inserted, the convexity 24 enters the recess 32a. If the filter element 30 is offcenter, the convexity 24 strikes the filter element 30 at the perimeter of the hole 32, and it becomes impossible to press the filter element 30 further into the case 10. If this occurs, the case 10 cannot be covered with the set plate 40, and it can be confirmed that the filter element 30 is mispositioned.

Figure 11:
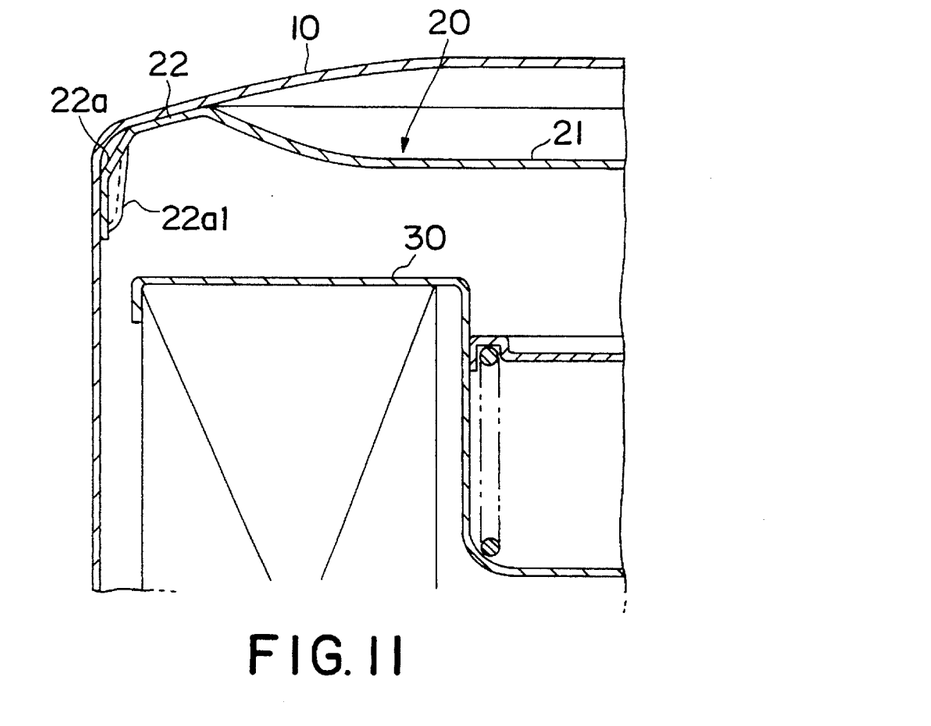
FIG. 11 is a sectional view of a portion of the filter showing a state in which another form of a spring is mounted to the case.

FIG. 11 depicts another form of a spring of a filter apparatus according to the present invention.

In this spring, the element-supporting arms 23 are not provided. Instead, the base 21 bulges toward the open end of the case 10.

Figure 12:
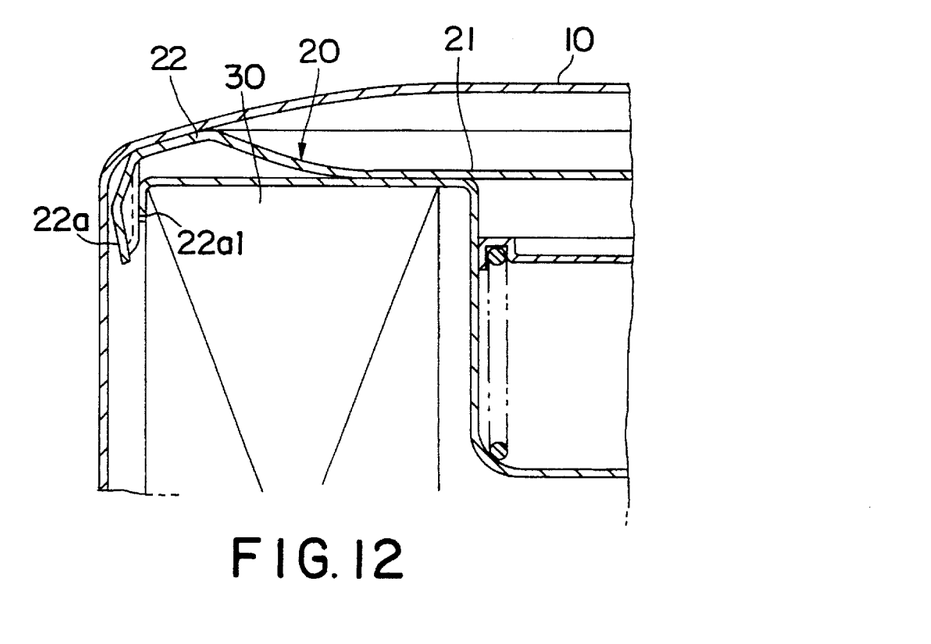
FIG. 12 is a similar view but showing the filter element in position.

When the spring 20 is inserted into the interior of the case 10, the wall-contacting arms 22 are flexed and press the inner peripheral wall of the casing 10 to maintain the spring 20 in place. When the filter element 30 is inserted into the case 10, the filter element 30 presses on and bends the base 21 located at the center of the spring 20 as shown in FIG. 12. Accordingly, the wall-contacting arms 22 flex inwardly and bend so as to enclose the periphery of the filter element 30. As a result, the filter element 30 is centered.

Although the embodiments of the present invention have been described as being used to filter oil, the present invention may be adapted for use in filtering other fluids as well. Additionally, the small-diameter portion 51 can be segmented so that the fastener has the form of a trivet. Furthermore, the engagement holes 45 can be recesses into which the engagement tabs 13 can be inserted instead of through-holes, i.e. instead of holes extending completely through the set plate 40.

Additionally, the large-diameter portion 12 of the case wall may be replaced with simply a flange which is bent outwardly from the shell portion 11.

Furthermore, it is also possible to employ a coil spring instead of the leaf springs 20. In this case, one end of the coil spring will have a small diameter and contact the filter element 30 while the other end of the coil spring will have a large diameter and press against the inner peripheral wall of the case 10. It is also possible to use a spring made out of heat-resistant rubber.

Other changes and modifications will become apparent to those of ordinary skill in the art. All such changes and modifications are seen to be within the true spirit and scope of the invention as defined by the appended claims.

We claim:

1. A filter comprising:

a case having a closed end and an open end, said case comprising a shell portion constituting a peripheral side wall of the case, a bottom at one end of said shell portion and constituting the closed end of the case, and a large-diameter portion which has a larger diameter than that of said shell portion and constituting the open end of the case, said large-diameter portion including a convexity forming an engagement tab;

filtering material housed within said case;

a cover which covers the open end of said case, said cover having a port defining a communication hole placing the interior and exterior of said case in communication, said cover having a screw thread on the outer periphery thereof, and said cover having a notch in the screw thread thereof and into which notch the convexity extends with the engagement tab engaging said cover to prevent said cover from rotating relative to said case; and an annular fastener having a screw thread on the inner periphery thereof mated with the screw thread on the outer periphery of said cover, said annular fastener also having a small-diameter portion the inner diameter of which is smaller than that of the large-diameter portion of said case.

2. A filter as claimed in claim 1, wherein said notch is open outwardly of said cover.

3. A filter as claimed in claim 1, and further comprising a partition member extending along an inner peripheral surface of said case toward the open end thereof and forming an annular groove with said large diameter portion, and a seal disposed in the annular groove.

4. A filter as claimed in claim 3, wherein said partition member has a notch therein aligned in the radial direction of the shell portion with the convexity of said large-diameter portion.

5. A filter as claimed in claim 1, wherein said fastener has a guide portion at an end thereof opposite said small-diameter portion said guide portion having a smooth inner surface at which the screw thread of the fastener terminates so that said surface will guide the screw thread of the cover into alignment with the screw thread of the fastener during assembly of the filter.

6. A filter apparatus as claimed in claim 1, and further comprising a resilient support housed within said case between said filtering material and the bottom wall of said case, said resilient support urging said filtering material toward said cover, and said resilient support having an engagement portion which contacts an inner peripheral surface of said case and extends between an outer surface of said filtering material and said peripheral wall.

7. A filter as claimed in claim 1, wherein said cover has a threaded hole extending therein.

8. A filter as claimed in claim 1, wherein said port has a screw thread extending around said communication hole.

9. A filter as claimed in claim 1, and further comprising an annular seal disposed in the large-diameter portion of said case and creating a seal between said case and said cover at the open end of said case.

10. A filter comprising:

a case having a closed end and an open end, said case comprising a shell portion constituting a peripheral side wall of the case, a bottom at one end of said shell portion and constituting the closed end of the case, and a large-diameter portion which has a larger diameter than that of said shell portion and constituting the open end of the case, said large-diameter portion including a convexity forming an engagement tab;

filtering material having a tubular sidewall and being housed within said case;

a cover which covers the open end of said case, said cover having a port defining a communication hole placing the interior and exterior of said case in communication, said cover having a screw thread on the outer periphery thereof, and said cover having a concavity into which the convexity is received with the engagement tab engaging said cover to prevent said cover from rotating relative to said case;

an annular fastener having a screw thread on the inner periphery thereof mated with the screw thread on the outer periphery of said cover, said annular fastener also having a small-diameter portion the inner diameter of which is smaller than that of the large-diameter portion of said case; and a resilient support housed within said case between said filtering material and the bottom of said case, said resilient support including means for urging said filtering material toward said cover, and said resilient support having a plurality of arms each having an engagement portion self-biased into engagement with the peripheral wall of said case, said arms extending between the tubular sidewall of said filtering material and the peripheral sidewall of said case.

11. A filter comprising:

a case having a closed end and an open end, said case comprising a shell portion constituting a peripheral side wall of the case, a bottom at one end of said shell portion and constituting the closed end of the case, and a large-diameter portion which has a larger diameter than that of said shell portion and constituting the open end of the case, said large-diameter portion including a convexity defining engagement means;

filtering material housed within said case;

a cover which covers the open end of said case, said cover having an inner surface facing toward said filtering material, said cover having an outer surface opposite said inner surface so as to face away from said filtering material, said cover having a port defining a communication hole placing the interior and exterior of said case in communication, said cover having a screw thread on the outer periphery thereof, and said cover defining an opening extending between and open to the inner and outer surfaces of said cover, said opening being exposed at the outer surface of said cover and the convexity being received within said opening with the engagement means engaging said cover so that the engagement means prevents said cover from rotating relative to said case and so that the engagement of the engagement means with said cover is visible from the outside of said case; and an annular fastener having a screw thread on the inner periphery thereof mated with the screw thread on the outer periphery of said cover, said annular fastener also having a small-diameter portion the inner diameter of which is smaller than that of the large-diameter portion of said case.

12. A filter as claimed in claim 11, wherein said opening is a notch in the screw thread of said cover and into which notch said convexity extends.

13. A filter as claimed in claim 11, wherein said fastener has a guide portion at an end thereof opposite said small-diameter portion, said guide portion having a smooth inner surface at which the screw thread of the fastener terminates so that said surface will guide the screw thread of the cover into alignment with the screw thread of the fastener during assembly of the filter.

14. A filter as claimed in claim 11, and further comprising a resilient support housed within said case between said filtering material and the bottom of said case, said resilient support urging said filtering material toward said cover, and said resilient support having an engagement portion self-biased into engagement with the peripheral wall of said case.

15. A filter apparatus as claimed in claim 11, and further comprising a resilient support housed within said case between said filtering material and the bottom wall of said case, said resilient support urging said filtering material toward said cover, and said resilient support having an engagement portion which contacts an inner peripheral surface of said case and extends between an outer surface of said filtering material and said peripheral wall.

16. A filter comprising:

a case having a closed end and an open end, said case comprising a shell portion constituting a peripheral side wall of the case a bottom at one end of said shell portion and constituting the closed end of the case, and a large-diameter portion which has a larger diameter than that of said shell portion and constituting the open end of the case, said large-diameter portion including a convexity forming an engagement tab;

filtering material housed within said case;

a cover which covers the open end of said case said cover having a port defining a communication hole placing the interior and exterior of said case in communication, said cover having a screw thread on the outer periphery thereof, and said cover having a notch in the screw thread thereof and into which notch said convexity extends with the engagement tab engaging said cover to prevent said cover from rotating relative to said case;

a resilient support housed within said case between said filtering material and the bottom of said case, said resilient support urging said filtering material toward said cover, said resilient support having an engagement portion self-biased into engagement with the peripheral wall of said case; and an annular fastener having a screw thread on the inner periphery thereof mated with the screw thread on the outer periphery of said cover, said annular fastener also having a small-diameter portion the inner diameter of which is smaller than that of the large-diameter portion of said case, said fastener further having a guide portion at an end thereof opposite said small-diameter portion, said guide portion having a smooth inner surface at which the screw thread of the fastener terminates so that said surface will guide the screw thread of the cover into alignment with the screw thread of the fastener during assembly of the filter.

17. A filter apparatus as claimed in claim 16, wherein the engagement portion of said resilient support contacts an inner peripheral surface of said case and extends between an outer surface of said filtering material and said peripheral wall.

18. A filter comprising:

a case having a closed end and an open end, said case comprising a shell portion constituting a peripheral side wall of the case, a bottom at one end of said shell portion and constituting the closed end of the case, and a large-diameter portion which has a larger diameter than that of said shell portion and constituting the open end of the case, said large-diameter portion including a convexity forming an engagement tab;

filtering material housed within said case;

a cover which covers the open end of said case, said cover having a port defining a communication hole placing the interior and exterior of said case in communication, said cover having a screw thread on the outer periphery thereof, and said cover having a concavity into which the convexity is received with the engagement tab engaging said cover to prevent said cover from rotating relative to said case;

an annular fastener having a screw thread on the inner periphery thereof mated with the screw thread on the outer periphery of said cover, said annular fastener also having a small-diameter portion the inner diameter of which is smaller than that of the large-diameter portion of said case; and a partition member extending along an inner peripheral surface of said case toward the open end thereof and forming an annular groove with said large diameter portion, and a seal disposed in the annular groove.

19. A filter as claimed in claim 19, wherein said partition member has a notch therein aligned in the radial direction of the shell portion with the convexity of said large-diameter portion.

* * * * *